Dec. 28, 1954   P. ARANT   2,697,868
METHOD OF MAKING HEATING COILS
Original Filed Aug. 6, 1946   5 Sheets-Sheet 1

INVENTOR
Perry Arant
BY
Bacon & Thomas
ATTORNEYS

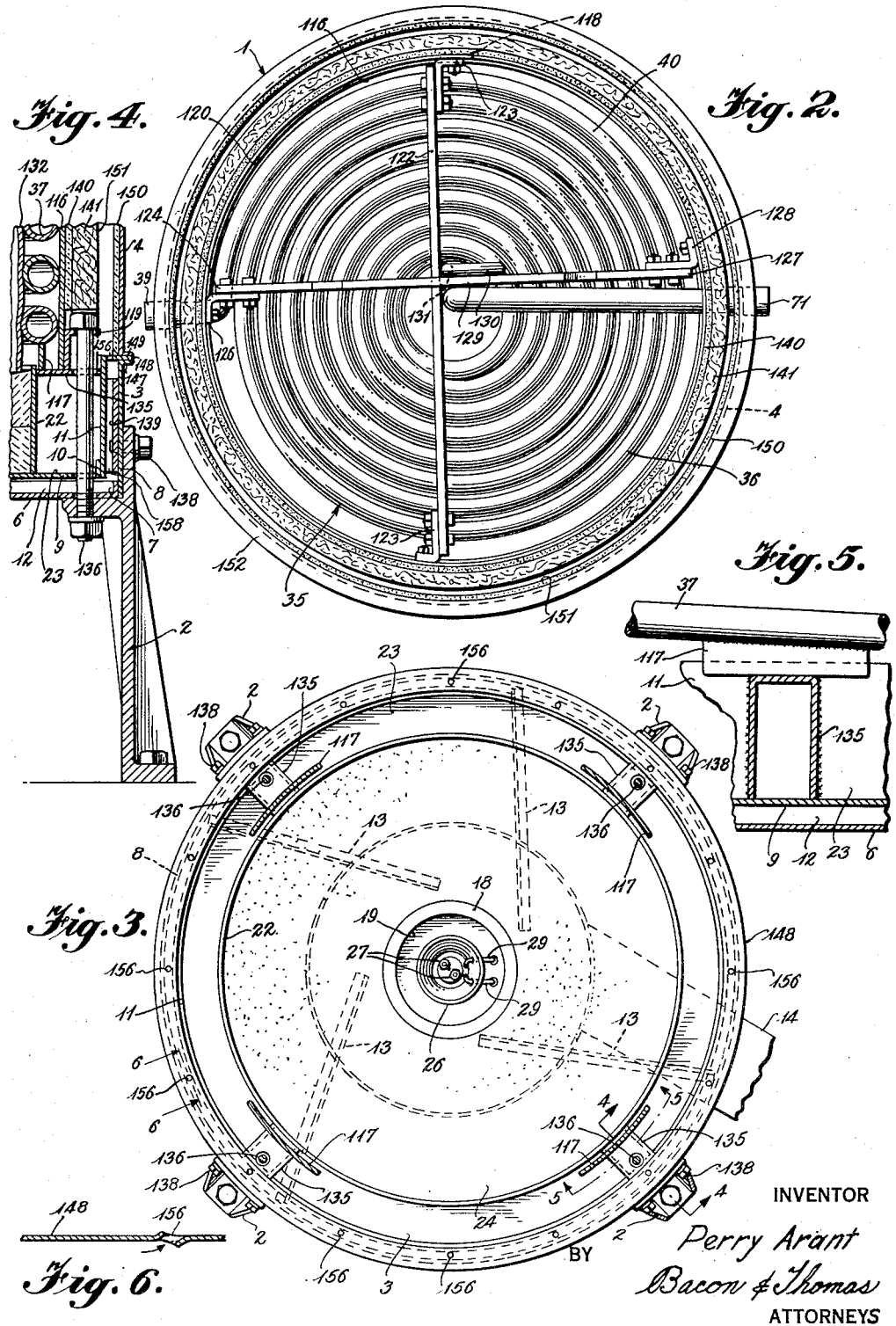

Dec. 28, 1954 P. ARANT 2,697,868
METHOD OF MAKING HEATING COILS
Original Filed Aug. 6, 1946 5 Sheets-Sheet 3
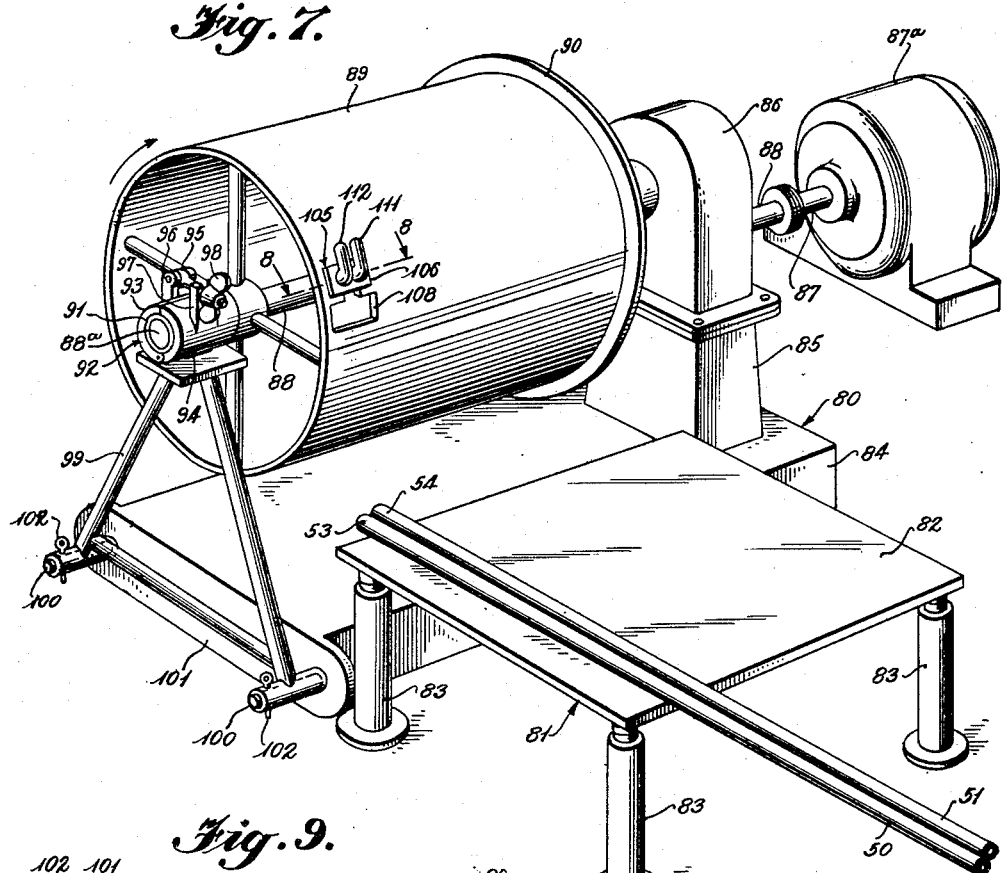
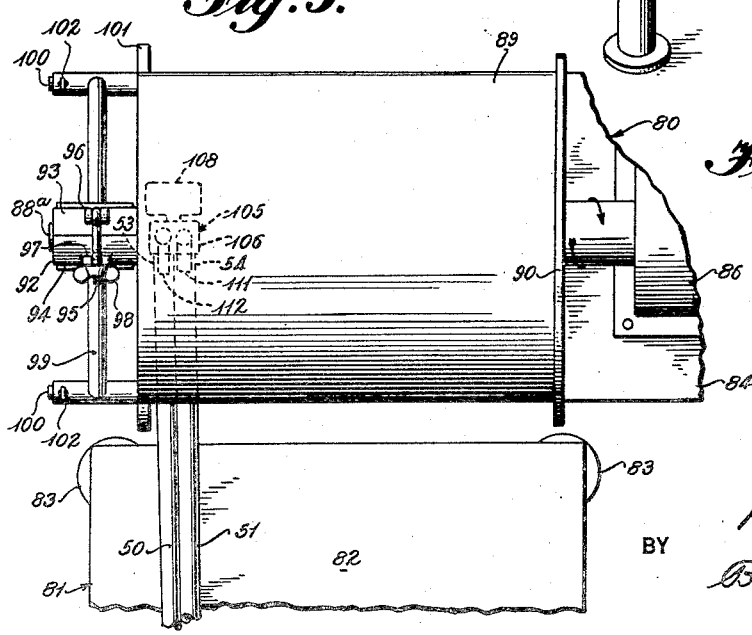
INVENTOR
Perry Arant
BY Bacon & Thomas
ATTORNEYS Dec. 28, 1954     P. ARANT     2,697,868
METHOD OF MAKING HEATING COILS
Original Filed Aug. 6, 1946     5 Sheets-Sheet 4
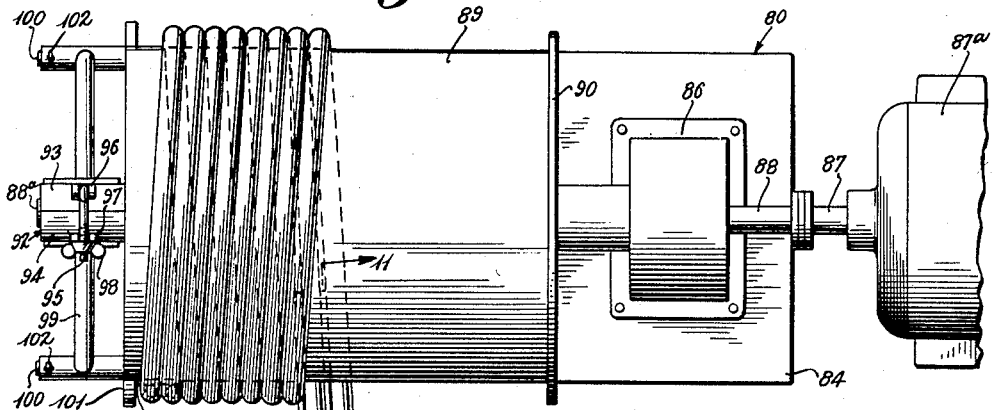
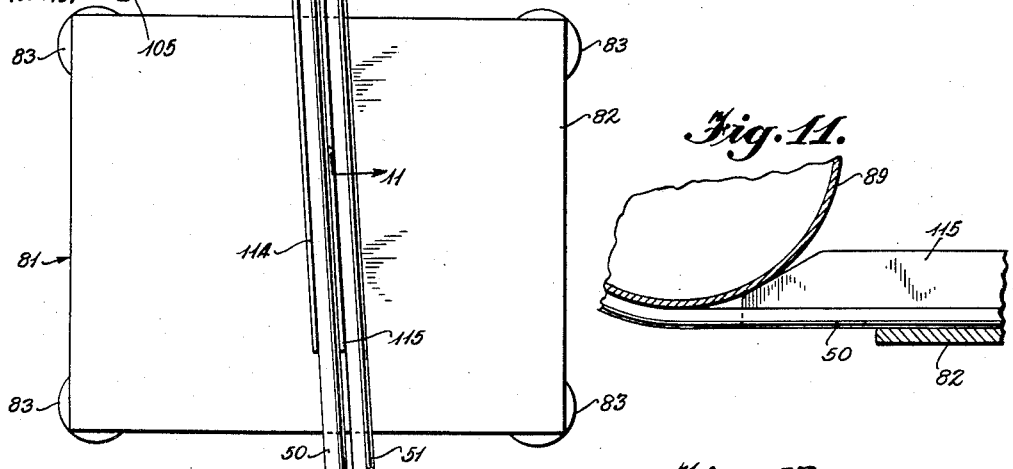
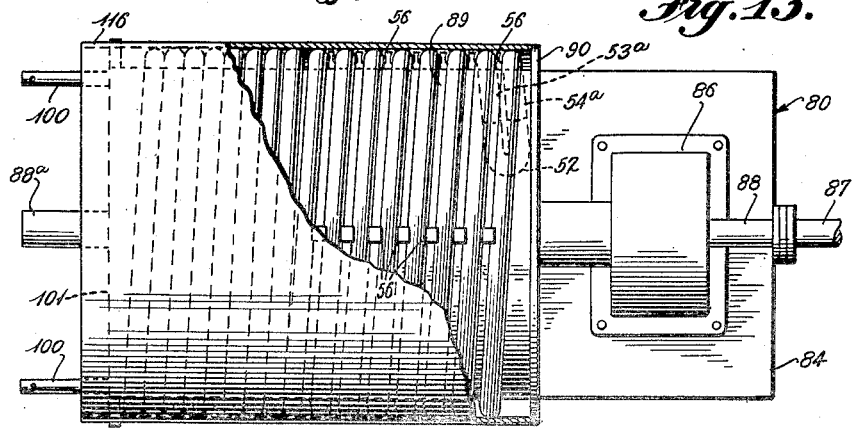
INVENTOR
Perry Arant
BY
Bacon & Thomas
ATTORNEYS Dec. 28, 1954   P. ARANT   2,697,868
METHOD OF MAKING HEATING COILS
Original Filed Aug. 6, 1946   5 Sheets-Sheet 5
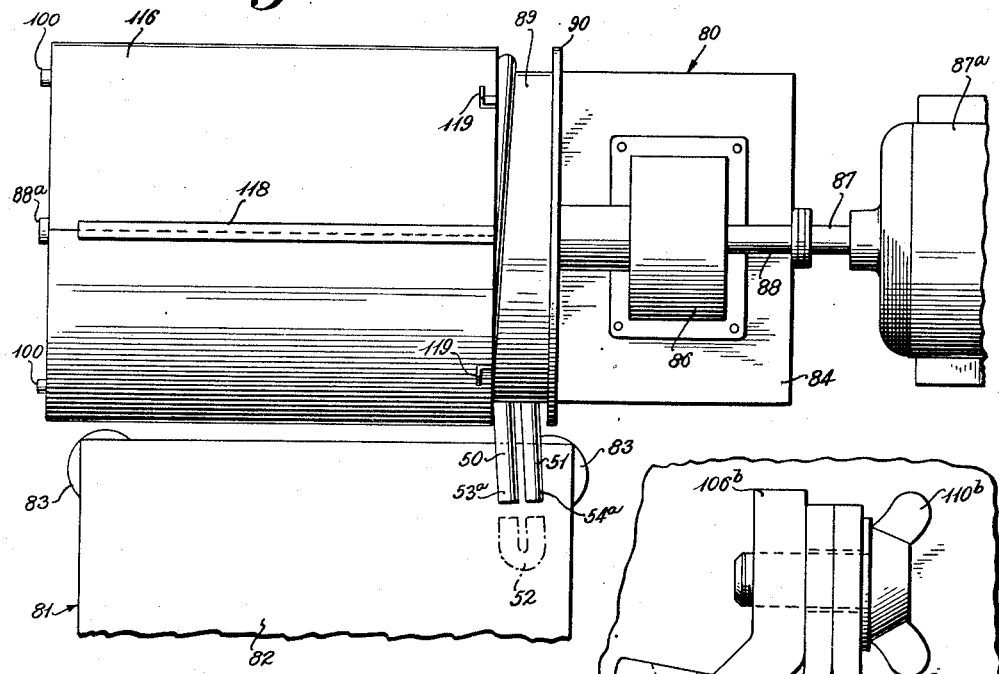
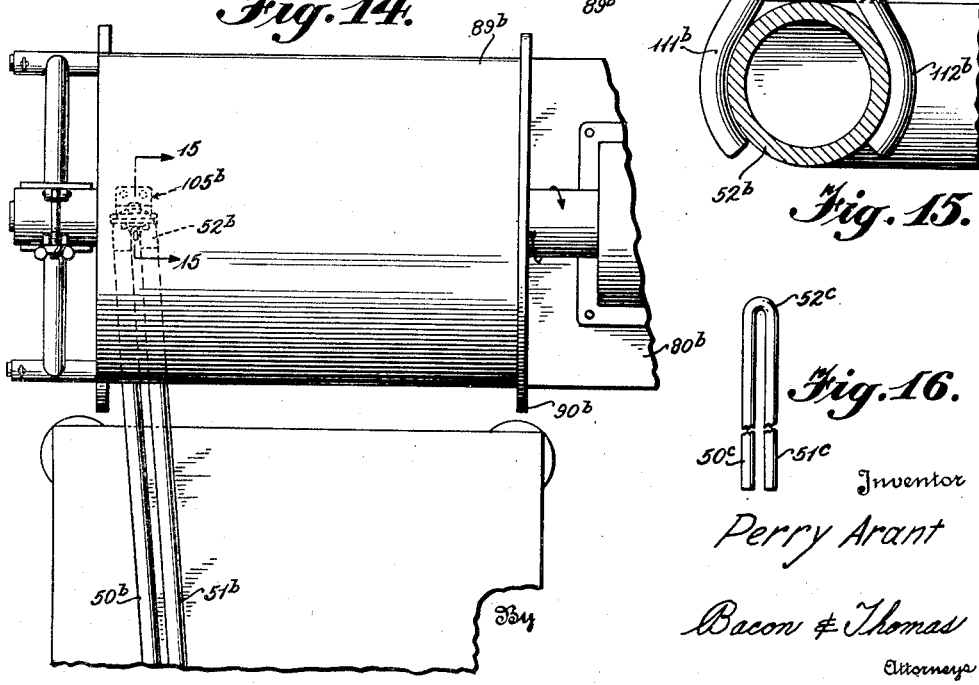
Inventor
Perry Arant
Bacon & Thomas
Attorneys

United States Patent Office 2,697,868
Patented Dec. 28, 1954

2,697,868

METHOD OF MAKING HEATING COILS

Perry Arant, Alhambra, Calif., assignor to Clayton Manufacturing Company, Alhambra, Calif., a corporation of California Original application August 6, 1946, Serial No. 688,720, now Patent No. 2,570,630, dated October 9, 1951. Divided and this application July 10, 1951, Serial No. 242,855

2 Claims. (Cl. 29—157.3)

The present invention relates to a heating coil construction, particularly adapted for use in steam generating apparatus, and to the method of making such coil.

This application is a division of application Serial No. 688,720, filed August 6, 1946, now Patent No. 2,570,630, granted October 9, 1951.

More specifically, the invention relates to a heating coil construction including a preheater section, a water wall section and a generating section, arranged in series in the order mentioned, and to the method of making such coil.

One of the principal objects of the invention is to obtain compactness and reduction in size of the heating coil for developing a given rated horsepower without sacrificing efficiency and economy.

Another object of the invention is to provide a heating coil construction which has great stability by virtue of the fact that it enables the fluid to be kept in a substantially liquid state until it is discharged into a steam generator or other zone of low pressure.

Another object of the invention is to provide a heating coil construction which will have a greatly increased life.

Another object of the invention is to provide a heating coil including a water wall arranged so that fluid can be returned from the water wall section to the main portion of the heating coil without the use of any external risers.

Another object of the invention is to provide a heating coil construction wherein liquid will always be present in the portion of the coil nearest the firebox to thereby assure that the radiant heat of the firebox will not evaporate the water therefrom so as to cause such portion of the coil to be empty when the burner is re-started.

Another object of the invention is to provide a combustion chamber lining means for steam generating apparatus which will eliminate the usual great thickness of insulating material normally required to satisfactorily resist the great heat generated by the combustion of fuel within the combustion chamber.

A further object of the invention is to provide a heating coil having a water wall section serving as a portion of the combustion chamber lining arranged so as to eliminate condensation of fuel oil and the formation of carbon deposits on said water wall section and to also eliminate the collection of condensed water on the external surface of said water wall section which would cause active corrosion thereof.

A still further object of the invention is to provide a steam generating apparatus in which liquid is forced through a heating coil at a given substantially constant rate and air is introduced into the combustion chamber under pressure at a substantially constant rate so that a forced draft is maintained through the heating coil for the products of combustion, with sufficient excess air supplied under pressure for diversion and use to maintain low jacket temperatures.

Other objects and features of the invention will be apparent from the following description taken in conjunction with the accompanying drawings, in which:

Fig. 2 is a sectional view taken on the line 2—2 of Fig. 1;

Fig. 3 is a sectional view on the line 3—3 of Fig. 1 and particularly illustrating the construction of the base of the apparatus and the air deflecting means for maintaining a low jacket temperature;

Fig. 4 is an enlarged fragmentary sectional view taken on the line 4—4 of Fig. 3, and illustrating the manner in which the shell surrounding the heating coil is assembled with the base and one of the legs of the apparatus;

Fig. 5 is an enlarged fragmentary sectional view taken on the line 5—5 of Fig. 3, and illustrating the means employed for supporting the helical water wall coil perpendicular with respect to the base of the apparatus;

Fig. 6 is an enlarged fragmentary sectional view taken on the line 6—6 of Fig. 3, and illustrating one of the apertures which establish communication between the annular air space in the base and the annular air space in the jacket, for facilitating "scooping" of the moving air from the base into the jacket air space.

Fig. 7 is a somewhat diagrammatic perspective view illustrating apparatus suitable for making the double wound water wall section of the heating coil;

Fig. 8 is an enlarged sectional view taken on the line 8—8 of Fig. 7, through the clamping means for securing the ends of two pipe sections to the mandrel of the winding apparatus;

Fig. 9 is a diagrammatic plan view showing the relationship of the mandrel clamp and pipes at the starting of the winding operation;

Fig. 10 is a view similar to Fig. 9 showing a portion of the double coil wound upon the mandrel with the turns closely adjacent each other, and spacer elements positioned to effect winding of the remainder of the coil with the turns spaced a predetermined distance apart;

Fig. 11 is a sectional view taken on the line 11—11 of Fig. 10;

Fig. 12 is a diagrammatic view illustrating the double wound coil in a substantially completely wound condition and with a shell slipped over the wound portion thereof;

Fig. 13 is a diagrammatic view illustrating the ends of the double wound coil interconnected by a return bend and with the shell completely enclosing the coil;

Fig. 14 is a diagrammatic view illustrating the manner in which two pipe sections pre-connected by a U-bend may be clamped to a mandrel to effect winding thereof;

Fig. 15 is an enlarged fragmentary sectional view on the line 15—15 of Fig. 14 illustrating the clamping means for securing the U-bend to the mandrel; and Fig. 16 illustrates a length of pipe provided with a U-band intermediate its ends and adapted to be wound upon the mandrel of Fig. 14.

Figure 1:
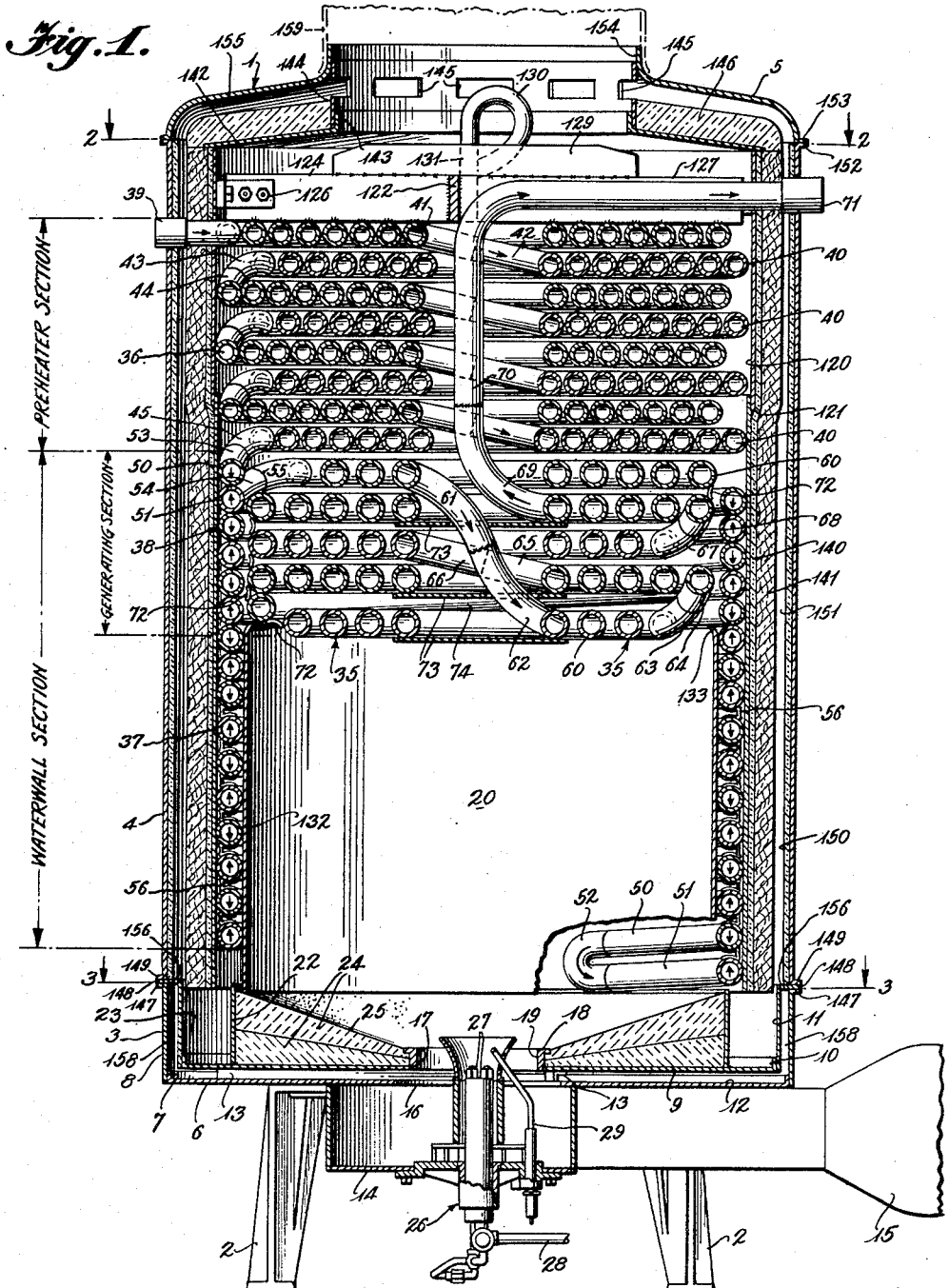
Fig. 1 is a longitudinal sectional view through a steam generating apparatus embodying the present novel heating coil, combustion chamber lining, and jacket cooling construction.

Referring now to Figs. 1 to 6, inclusive, of the drawings, the numeral 1 generally identifies the steam generating apparatus which includes legs 2 supporting a housing comprising a base 3, an intermediate jacket section 4, and a top section 5.

The base 3 includes a lower horizontal, circular bottom wall 6 having a peripheral flange 7 welded to the lower end of an outer ring 8. The base 3 further includes an upper horizontal, circular wall 9 provided with a flange 10 at its outer periphery welded to the lower end of an intermediate ring 11 arranged concentric with the ring 8. The walls 6 and 9 are spaced apart to provide an air space 12 therebetween. A plurality of air deflecting baffles 13 are spot welded to the underside of the wall 9 and serve as spacing means between the walls 9 and 6. An air supply duct 14 is disposed below the wall 6 and secured thereto in any desired manner. A blower 15 forces air under pressure into the duct 14. The wall 6 is provided with a central air inlet opening 16 communicating with the air supply duct 14. The duct 14 is preferably designed to deliver air to the opening 16 moving at high velocity in a counterclockwise, spiral or volute path and may be constructed, for example, in the manner disclosed in Kerrick Patent 2,284,906. The wall 9 is provided with an opening 17 arranged concentric with the opening 16 of the wall 6, but of smaller diameter, and has a bushing 18 mounted therein. The bushing 18 has a passageway 19 which establishes communication between the air supply duct 14 and a combustion chamber 20 within the jacket 4 above the base 3. The passage in the bushing 18 is smaller than the opening 16 and therefore a portion of the air supplied through the duct 14 is deflected laterally or outwardly by the wall 9 into the space 12 between the walls 6 and 9 to maintain a low jacket temperature, as will be explained later.

It will be understood, of course, that a forced draft is maintained in the steam generating apparatus 1 and to this end air is forced into the supply duct 14 by the blower 15 which is capable of supplying a greater volume of air than is required for complete combustion of the fuel, with sufficient excess for diversion into the air space 12 for jacket cooling.

An inner ring 22 is preferably welded at its lower end to the upper side of the wall 9 and is arranged concentric with the ring 8 and 11. The ring 22 is considerably smaller than the ring 11 providing a space 23 between the outer periphery thereof and the inner periphery of the ring 11. Suitable refractory material 24 is disposed between the bushing 18 and the ring 22 and is supported by the wall 9. The upper surface 25 of the refractory material 24 is inclined downwardly toward the bushing 18, as best shown in Fig. 1.

The air inlet duct 14 supports a burner device 26 including a pair of nozzles 27 for atomizing the fuel introduced into the combustion chamber 20. A pipe 28 is connected to the burner 26 for supplying fuel thereto, and electrode means 29 is arranged to initiate ignition of the fuel.

The steam generating apparatus 1 includes a novel heating coil construction generally identified by the numeral 35. The heating coil 35 includes a preheater section 36, a water wall section 37 and a generating section 38, arranged in series flow, but with the generating section 38 disposed below the preheater section 36 and within the upper end portion of the water wall section 37. The preheater section 36 has an inlet 39 and may include any suitable number of spirally wound pancake coil sections 40 arranged in superposed relation. In one operative form of the invention, the preheater section 36 includes, for example, eight individually wound pancake coils 40, as illustrated in Fig. 1, and the inner end or outlet 41 of the uppermost pancake coil 40 is welded to the inner end or inlet 42 of the second pancake coil 40, and the outlet 43 of said second pancake coil is welded to the inlet 44 of the third pancake coil 40, and so on, throughout the height of the preheater section 36, with the result that the pancake coils 40 are interconnected in series and the outlet of the preheater section 36 is located at the outer end 45 of the lowermost pancake coil 40.

The water wall section 37 consists of a double wound helical coil preferably made of two predetermined lengths of pipe 50 and 51 interconnected at one end in the finished coil by a return bend 52. The method of winding the double coil 37 is set out in full hereinafter. The end 53 of the pipe 50, remote from the return bend 52, is welded to the outlet end 45 of the preheater section 36, and the corresponding end 54 of the pipe 51 is welded to the inlet 55 of the generating section 38. The double winding of the water wall section 37 provides a construction in which the fluid flows downwardly for the full length of the pipe 50, or in a direction counter to that of the path of travel of the combustion gases, and then reverses flow at the return bend 52 and flows upwardly in the pipe 51 toward its end 54 in the same general direction as the travel of the combustion gases; the result being that the fluid flow in any two adjacent turns of the water wall section 37 occurs in opposite directions, as indicated by the arrows in Fig. 1. In the present construction, the water wall 37 is illustrated as having, for example, about sixteen complete turns disposed vertically one above the other, with the upper half, or first eight turns, is substantially abutting relation and with the remaining eight turns spaced about ½ inch apart, and maintained in such spaced relation by clips 56 welded to or inserted between adjacent turns. The object of the different spacing of the turns of the water wall section 37 will be explained later.

The generating section 38 is shown in Fig. 1 as consisting, for example, of five individual pancake coils 60 arranged so that the inner end 61 of the uppermost or first pancake coil 60 is welded directly to the inner end 62 of the lowermost or fifth pancake coil 60. The outer end 63 of the lowermost pancake coil 60 is welded to the outer end 64 of the next adjacent, or fourth, pancake coil 60, the inner end 65 of the fourth pancake coil is welded to the inner end 66 of the third pancake coil, the outer end 67 of the third pancake coil is welded to the outer end 68 of the second pancake coil, and the inner end 69 of the second pancake coil is welded to one end 70 of a discharge pipe 71.

Thus, the fluid discharged from the upper end 54 of the water wall section 37 enters the first pancake coil 60 of the generating section 38 and flows therefrom to the lowermost pancake coil 60 and then upwardly through the fourth, third and second pancake coils and into the discharge pipe 71, by flowing in the same general direction as the travel of the combustion gases.

The pancake coils 60 are slightly spaced apart and are held in such spaced relation by clips 72 welded or otherwise secured to the outermost coils thereof. A baffle plate 73 is arranged in the generating section between the second and third pancake coils 60, the fourth and fifth pancake coils 60 and below the fifth pancake coil 60 to prevent the direct passage of combustion gases through the core 74 formed at the central portion of the generating section 38. Soot blowers (not shown) are preferably disposed between the pancake coils 40 of the preheater section 36.

It will be convenient, at this point, to describe the apparatus and method employed in making the double wound water wall section 37, and reference will therefore be made to Figs. 7 to 13, inclusive.

In Fig. 7, the numeral 80 generally identifies the coil winding apparatus, and such apparatus includes a table 81 having a top 82 and legs 83 which are adjustable vertically to vary the inclination and/or height of the table top 82 relative to the coil winding apparatus 80. The table top 82 serves as a support for the pipes 50 and 51, previously referred to. The winding apparatus 80 further includes a base 84 having a pedestal 85 mounted at one end thereof, and a conventional gear reduction unit 86 mounted upon said pedestal. A shaft 87 driven by a reversible motor 87a constitutes a drive for the gear reduction unit 85, and a shaft 88 constitutes the driven shaft of the gear reduction unit 86. The shaft 88 drives a shaft 88a having a hollow cylindrical mandrel 89 mounted thereon provided with a flange 90 at the inner end thereof. The outer end of the shaft 88a carries a bushing 91 (Fig. 7), which is supported in a journal 92 comprising hinged sections 93 and 94 which are releasably held engaged with the bushing 91 by the coaction of a bolt 95 pivotally mounted upon ears 96 on the bearing section 93 and projecting between ears 97 on the bearing section 94, the latter being engaged by a thumb screw 98 threaded onto the bolt 95. The journal 92 is carried by a triangular frame 99, which is detachably supported upon the base 84 upon studs 100 projecting longitudinally from one end 101 of said base. The frame 99 is removably retained in position upon the studs 100 by pins 102.

The mandrel 89 carries a clamp 105 for securing the ends 53 and 54 of the pipes 50 and 51 to the mandrel 89 to effect winding thereof. The clamp 105 includes a plate 106 having a stud 107 (Fig. 8) projecting inwardly therefrom and normally disposed in the stem portion of a T-shaped slot 108 formed in the mandrel 89 at a point near the unflanged end thereof. A washer 109 is disposed upon the stud 107 for engagement with the inner surface of the mandrel 89 and a wing nut 110 is threaded onto the stud 107 for detachably securing the clamp 105 to the mandrel 89. The plate 106 carries circumferentially projecting fingers 111 and 112 of a diameter small enough to be snugly received in the ends 53 and 54 of the pipes 50 and 51, respectively. The opening 108 is sufficiently large to enable the plate 106 and the fingers 111 and 112 carried thereby to pass therethrough for removal from the interior of the mandrel 89, as will be explained later.

Fig. 9 illustrates the coil winding apparatus 80 in the position it assumes at the beginning of a winding operation. Thus, it will be noted that the mandrel 89 has been rotated to a position where the clamp 105 is disposed at the lower side thereof, and the pipes 50 and 51 have been advanced by the machine operator until the ends 53 and 54 thereof have the ends of the fingers 112 and 111, respectively, received therein. This provides a quick and simple way of securing the ends 53 and 54 of the pipes 50 and 51 to the mandrel 89 to effect winding thereof. The motor 87a is started to cause driving of the mandrel 89 in a clockwise direction, as viewed in Fig. 7, whereupon winding of the pipes 50 and 51 upon the mandrel 89 commences. The pipes 50 and 51 are guided during the winding operation by the operator to effect close winding of, say, the first eight turns of the coil. The motor 87a is then preferably stopped and a spacer element or plate 114 (Fig. 10) is inserted between the pipe 50 and the last wound turn of the coil, and another spacer element or plate 115 is inserted between the pipes 50 and 51. The spacer elements 114 and 115 are supported upon the table top 82 and extend to a point well under the mandrel 89 as will be apparent from Fig. 11. The thickness of the plates 114 and 115 will vary in accordance with the desired spacing of the turns of the lower end portion of the water wall section 37, and in the illustrative example shown, these plates are ½ inch thick. The motor 87ᵃ is restarted to drive the mandrel 89 in the same direction as before to continue the winding of the coil. The winding of the coil is interrupted as the ends 53ᵃ and 54ᵃ (Fig. 12) of the pipes 50 and 51 approach the edge of the table top 82 nearest to the mandrel 89. The clips 56 are now preferably attached to or inserted between the spaced turns of the coils to maintain the same spaced apart.

The thumb screw 98 may be loosened to release the journal 92 from the bushing 91 and the pins 102 removed to permit detachment of the frame 99 from the base 84. A shell 116 of predetermined internal diameter may then be slipped over the unsupported end of the mandrel 89 onto the wound portion of the double coil until it engages the unwound ends of the pipes 50 and 51, as illustrated in Fig. 12. The driving torque on the mandrel 89 is then released by reversing the motor 87ᵃ and the two helical coils formed from the pipes 50 and 51 are allowed to partially unwind into engagement with the inner surface of the shell 116. The pipe ends 53ᵃ and 54ᵃ are evened up, if necessary, and the return bend 51 is then welded thereto. The ends 53ᵃ and 54ᵃ with the return bend 52 attached thereto are then bent around the mandrel 89, and the shell 116 is then pushed over the remainder of the coil into engagement with the flange 90, as shown in Fig. 13. The wing nut 110 is then loosened, thereby releasing the clamp 105 and said clamp is then moved toward the head of the T-slot 108 so that it can be withdrawn through said slot to permit the double wound coil 37 and the shell 116 to be removed simultaneously from the mandrel 89.

The shell 116 is formed from a rolled sheet of metal and its longitudinal edges are placed in abutment and a strip 118 (Fig. 12) is welded to the shell 116 at the abutting portions thereof to hold the same in cylindrical form. A plurality of angle brackets 119 is welded to the shell 116 adjacent one end thereof.

The lowermost turn of the coil 37, of course, is arranged on a helix and in order to support the same vertically, a plurality of strips or feet 117 (Figs. 3 and 5) of different vertical height are welded to the lower side of said turn.

After the feet 117 have been welded to the water wall section 37, the shell 116 is slipped down and the end 54 of said section is welded to the inlet end 55 of the generating section 38, and the end 53 is welded to the outlet end 45 of the preheater section 36. The shell 116 is restored to its original position but is of insufficient length to enclose the preheater section 36 and, hence, a second shell 120 (Fig. 1), having the main inlet 39 and the discharge pipe 71 extending therethrough, is arranged in telescoping relation with the shell 116 and is welded at its lower end 121 to the upper end of the shell 116.

A crossbar 122 (Fig. 2) extends across the upper portion of the shell 120 and the opposite ends thereof are secured to said shell by brackets 123 bolted to said crossbar and shell, respectively. A second bar 124 arranged at right angles to the crossbar 122 has one end welded to the adjacent side of the crossbar 122 and its other end fastened to the shell 120 by a bracket 126 bolted to both said bar and shell. Another bar 127 has one end thereof welded to the opposite side of the crossbar 122 and its opposite end is secured by a bracket 128 and suitable bolts to the shell 116. A tie bar 129 (Fig. 1) bridges the crossbar 122 and overlies the adjacent end portions of the bars 124 and 127 and is welded along its lower edges to all of said bars to stiffen the same and form a rigid bridge across the crossbar 122. A hook member 130 has a shank 131 disposed at the point of juncture of the bars 122 and 127 and is welded thereto and to the tie bar 129. The lower edges of the bars 122, 124 and 127 are preferably welded to the upper pancake coil section 40 of the preheater section 36. The hook 130 thus provides a convenient device for handling the entire shell and coil assembly by means of a crane (not shown). After the assembly of the coil and shell has been completed, as above described, the same is subjected to a conventional heat treatment to relieve all stresses and strains therein.

After the coil assembly has been heat treated, a stainless steel cylindrical sheet liner 132 (Fig. 1) is inserted within the lower portion of the water wall section 37. The height of the liner 132 is preferably such that it extends upwardly into the region of the generating coil section 38. The upper end of the liner 132 is curved inwardly, as indicated at 133 to facilitate such insertion. The liner 132 is preferably made of stainless steel, that is, a chrome-nickel steel, commercially known as 18–8 stainless steel, although other stainless steels of different ratio of chrome to nickel have been found to be satisfactory. Ordinary sheet iron may also be used in making the liner 132, but the life of such a liner is relatively short and stainless steel is preferred because it eliminates the replacement problem.

The thickness of the stainless steel liner 132 is of the order of .04 inch to .14 inch and preferably .06 inch. The heavier gauge material is capable of slightly deforming out of round individual turns of the water wall section 37 so that good heat transfer contact can be maintained between the outer surface of the liner 132 and the inner surface of all of the coil turns. The liner 132 is made by rolling a flat sheet of stainless steel into cylindrical form and then welding or otherwise securing the vertical edges together. Afterward, one end is rolled to turn the same inwardly to provide the rounded edge 133, previously referred to.

The external diameter of the liner 132 is dependent upon the internal diameter of the water wall section 37 and their relative rates of thermal expansion. In this connection, the liner 132 is made of such external diameter that it can be readily slipped into the water wall section 37 with some slight clearance, the clearance being such that it will subsequently be eliminated under normal combustion temperatures by expansion of the liner 132 into positive contact with the innermost surfaces of the water wall section 37.

In one operative example of a 50 horsepower unit, the internal diameter of the turns of the water wall section 37 was 23⅛ inches and the outer diameter of the liner 132 was 22⅞ inches, thus allowing ¼ of an inch total clearance for expansion. The internal diameter of the turns of the water wall section 37 is held to a desired dimension by the expedient of employing the shell 116 of predetermined internal diameter and the step of allowing the helical coils formed from the pipes 50 and 51 to only partially unwind after the shell 116 has been slipped thereover, as described herein in connection with the method of making said water wall section.

No special heat treatment is given to the stainless steel liner 132; it is simply inserted within the water wall section 37 after the coil assembly 35 has been stress-relieved. In operation, the liner 132 will expand into positive engagement with the surrounding turns of the water wall section 37, and in some instances may bulge slightly outwardly between adjacent turns, as illustrated to an exaggerated degree in Fig. 4. Normally, however, the liner 132 will contract upon cooling, so that it can be readily removed from the coil 37. After the unit has been in operation for a period of time, the coil 37 and the liner 132 take a more or less permanent set, in contact, as a result of the loss of elasticity due to repeated heating and cooling.

When the pipe being wound to form the water wall section 37 is smaller than one inch in external diameter, it is unnecessary to place the shell 116 thereover to limit the extent of unwinding thereof. The reason for this is that, with a smaller diameter pipe, the pipe takes a more or less permanent set as it is wound upon the mandrel 89, and does not tend to unwind to any substantial degree, thus no difficulty arises in maintaining a fixed internal diameter. However, when pipe, such as the pipes 50 and 51, of an external diameter greater than one inch is wound upon the mandrel 89, the inherent elasticity of the pipe would, unless constrained, cause the same to unwind to a considerable degree and result in coils of varying internal diameter. To avoid this, the shell 116, of predetermined internal diameter, is slipped over the coil on the mandrel 89 to limit the extent of unwinding of the helical coils when the driving torque on said mandrel is released. In this manner, it is possible to maintain the internal diameter of the double wound coil 37 to a given size so that a liner 132 of predetermined external diameter will properly fit and expand into positive engagement with the inner surface of the coil during operation of the steam generating apparatus 1.

While the aforedescribed method of winding the water wall section 37 contemplates joining the ends of the pipes 50 and 51 by a return bend 52, after said pipes have been wound upon the mandrel 89, Figs. 14 and 15 indicate the manner in which a double wound coil can be formed by first interconnecting the ends of two pipes by a return bend and clamping the return bend to the winding mandrel. Thus, two lengths of pipe 50$^b$ and 51$^b$ may be first interconnected by a return bend 52$^b$. As an alternative to this procedure, a single length of tubing may be bent substantially medially of its length to provide a return bend 52$^c$ and substantially parallel portions 50$^c$ and 51$^c$, as diagrammatically illustrated in Fig. 16. In either event, the tubular material to be wound is connected to a mandrel 89$^b$, of a winding apparatus 80$^b$ similar to the apparatus 80, by a clamping device generally identified by the numeral 105$^b$. The clamping device 105$^b$ includes a bracket 106$^b$ which is riveted or otherwise permanently secured to the inner face of the mandrel 89$^b$ adjacent an opening 108$^b$. Clamping fingers 111$^b$ and 112$^b$ extend through the opening 108$^b$ and grip the inner and outer portions of the U-bend 52$^b$, as best illustrated in Fig. 15. A wing bolt 110$^b$ extends through the clamping fingers 111$^b$ and 112$^b$ and is threaded into the bracket 106$^b$.

After the U-bend 52$^b$ has been clamped to the mandrel 89$^b$, one turn of the pipes 50$^b$ and 51$^b$ is wound upon the mandrel 89$^b$, and spacing elements, such as the elements 114 and 115 shown in Fig. 10, are disposed between the pipes 50$^b$ and 51$^b$ and between the pipe 50$^b$ and the adjacent wound turn of the coil, as will be readily understood, to effect spacing of the turns adjacent the return bend 52$^b$ a predetermined distance apart. After the desired number of spaced turns has been wound upon the mandrel 89$^b$, the spacing elements are removed and the remainder of the pipes 50$^b$ and 51$^b$ is wound upon said mandrel with the turns in contact, under the guidance of the operator.

It will also be understood that when pipe in excess of 1" external diameter is wound upon the mandrel 89$^b$, winding of the coil will be continued until the pipes 50$^b$ and 51$^b$ have been almost completely wound thereon. Then a shell, similar to the shell 116, will be slipped over the wound portion of the coil, and the winding torque released slightly to permit the turns to partially unwind and expand into engagement with the inner surface of the shell. Of course, the shell will be slipped over the mandrel 89$^b$ in a manner opposite to that shown in Fig. 12, i. e., so that the brackets 119 mounted upon the shell will be disposed adjacent the end of the coil having the return bend 52$^b$. The unwound portions of the pipes 50$^b$ and 51$^b$ are then bent against the mandrel 89$^b$ and the shell is slipped farther onto the mandrel to completely enclose the coil.

The removal of the wound coil from the mandrel 89$^b$, irrespective of whether it is enclosed in a shell or not, can be effected by removing the wing bolt 110$^b$ and withdrawing the clamping fingers 111$^b$ and 112$^b$ into the interior of the mandrel 89$^b$ through the opening 108$^b$ and then sliding the coil lengthwise off the mandrel 89$^b$ in a direction away from the flange 90$^b$.

Continuing now with the description of the remainder of the steam generating unit 1, four inverted U-shaped members 135 (Figs. 3 and 4) are disposed in the space 23 and their end edges are respectively welded to the rings 11 and 22. The U-shaped members 135 are arranged to serve as supports for the feet 117 at the lower end of the water wall section 37. The members 135 are also vertically aligned with the brackets 119 secured to the lower end of the shell 116. Bolts 136 project through the brackets 119, the horizontal wall of the U-shaped members 135, through openings in the bottom walls 9 and 6 and through an opening in the supporting legs 2, as best illustrated in Fig. 4, for securing the shell 116 in assembled relation with the base 3 and legs 2. The legs 2 are additionally secured to the base 3 by bolts 138 which extend through the ring 8 and into a reinforcing strip 139 (Fig. 4) engaging the inner surface of the ring 8.

Layers 140 and 141 of heat insulating material surround the shells 116 and 120 to minimize heat losses. A cap member 142 is disposed above the upper end of the shell 120 and is secured thereto in any suitable manner. The cap 142 has a central flue opening 143 and a sleeve 144 provided with openings 145 surrounds the flue opening 143. A layer of insulating material 146 is disposed outwardly of the sleeve 144 and overlies the upper surface of the cap 142, as shown.

The outer ring 8 of the base 3 has an outwardly extending flange 147 (Figs. 1 and 3) at its upper end, and the intermediate ring 11 has an outwardly projecting flange 148 which overlies and engages the flange 147. The lower end of the jacket section 4 has an outwardly extending flange 149 that rests upon the flange 148. The flanges 147, 148 and 149 may be bolted or welded together, as desired. The jacket 4 has a lining of insulating material 150 which is arranged outwardly of the insulating material 141 to provide an annular air space 151 completely surrounding the insulated heating coil assembly.

The upper end of the jacket 4 has an outwardly extending flange 152 (Fig. 1) and the cap 5 has a similar flange 153 resting upon the flange 152. The flanges 152 and 153 may be bolted or welded together, as desired. The sleeve 144 projects into an opening 154 in the cap 5 so that an air space 155, communicating with the annular air space 151, is formed between the inner surface of said cap and the insulating material 146, the openings 145 providing communication between the air space 155 and the flue opening 143.

The flange 148 of the intermediate ring 11 contains a plurality of circumferentially spaced apertures 156 which have their edges bent, as indicated in Fig. 6, to form air scoops facing in a counterclockwise direction. These apertures establish communication between the annular air space 151 in the jacket 4 and an annular air space 158 between the rings 8 and 11. Accordingly, air travelling in a counterclockwise, spiral path and introduced through the opening 16 into the air space 21 in the base 3 is deflected outwardly by the overlying portion of the wall 9 and the baffles 12 into the air space 158, and is scooped by the leading edges of the apertures 156, into the annular jacket air space 151 to remove any heat that has passed through the insulating layers 141—142, whereby to maintain the temperature of the jacket 4 at a minimum to prevent undue heating of the boiler room or chamber in which the steam generating unit 1 is installed. The heated air forced out of the air space 151 passes through the air space 155, openings 145 and is exhausted into a stack 159 surrounding the opening 154 in the cover 5.

It will be noted from Fig. 1 that the lower end of the liner 132 rests upon the upper surface 25 of the refractory material 24. The object of such arrangement is to provide a seal at the lower end of the liner 132 that will keep the fuel confined within the combustion chamber 20 so that it cannot leak into the space occupied by the water wall section 37 and the insulating material 140, 141 and 150. The seal is particularly important when gaseous fuels are used inasmuch as under such conditions it would be highly undesirable to have combustible material leak out of the combustion chamber into the air space 151 surrounding the coil 35 in view of the fire hazard which it would present. In the case of liquid fuels, such as oil, the same might also constitute a fire hazard, but oil presents the further objection in that it would be absorbed by the insulating material and decrease the efficiency thereof.

In actual operation, operating temperatures in steam generating units of the character comprising the present invention range from 2500° F. to 2900° F. depending upon the size of the unit. The highest temperature which present-day refractory materials are capable of withstanding is about 2900 to 3000° F. maximum, which does not leave any margin of temperature resistance to resist direct flame impingement causing heating above the maximum and which most generally causes refractory failure at the point of flame impingement. The present invention eliminates the use of refractory material in the side walls of the combustion chamber by incorporating a water wall section 37 and a stainless steel liner 132, which was unexpectedly found to satisfactorily solve the problem of resisting excessively high combustion chamber temperatures. In fact, the present liner has withstood operating temperatures of 3000° F. without failure. The stainless steel liner 132 serves not only to rapidly transfer heat therefrom to the water wall section 37 to thereby avoid excessive overheating of said liner, but transfers enough heat to the coil 37 to prevent condensation of liquid fuels and moisture thereon.

A further advantage of the sheet metal liner 132 and water wall arrangement 37 disclosed herein is that it greatly outlasts refractory walls, but what is more important, makes it possible to make the unit more compact by not occupying anywhere near as great a space as would normally be required for the thickness of refractory material necessary to withstand the same combustion chamber temperatures.

It is important to make the metal liner 132 of a dimension that will allow the liner to expand and make positive contact with the turns of the water wall 37 upon thermal expansion thereof. If insufficient clearance for expansion is allowed, the liner 132 will buckle upon expansion and burn or scale at the buckle points. On the other hand, if too much clearance is provided, the liner will not expand into heat-transferring contact with the water wall 37 and burn or scale because of improper cooling thereof.

Insofar as the operation of the heating coil itself is concerned, the liquid to be heated is introduced through the inlet 39 into the preheater section 36 so that the liquid is preheated before it enters the water wall section 37. Hence, too low temperatures in the water wall section 37 are avoided, and this eliminates condensation of fuel vapor which would cause carbon deposits. It also eliminates collection of and condensation of moisture from the air on the external surface of the water wall tubing, which would result in active corrosion. The water wall section 37, as previously explained, is double wound so that the fluid flows downwardly in the water wall section in the helical coil portion formed by the pipe 50 and upwardly in the water wall section 37 through the helical coil portion formed by the pipe 51, to be discharged into the uppermost pancake coil 60 of the generating section 38. The fluid passes through the first pancake coil 60 of the generating section 38 and then directly to the bottom pancake coil 60, and at this point changes from counterflow to direct flow and passes upwardly through the balance of the pancake coils 60 and is then discharged through the riser pipe 71 into a steam separator (not shown) or any other apparatus.

The upper turns of the water wall section 37 are arranged closely adjacent each other for the purpose of providing a combustion gas seal at the critical point or level of the combustion chamber 20; whereas, the lowermost turns of the water wall section 37 are spaced apart to facilitate absorption of the radiant heat of the liner 132, the surface of the water wall coils 37 directly in contact with the liner 132, of course, absorbing heat by direct conduction. The vertical spacing or pitch of the lower coils of the water wall section 37 is such that sufficient heat transfer will be effected by direct conduction and radiation to maintain the liner 132 sufficiently cool to prevent overheating or burning out of the same.

The double wound water wall 37 provides a return pass for the fluid without requiring the necessity of employing any external piping or tubing. At the same time, the flow of the fluid through the water wall section 37 results in the absorption of heat from the combustion chamber and from the liner 132 so that the fluid is discharged into the generating section 38 at a slightly elevated temperature above that at which it entered the water wall section 37.

The object of connecting the upper pancake coil 60 of the generating section 38 to the lower pancake coil of said section is to provide a construction in which some fluid is always present in the pancake coil 60 nearest to the combustion chamber 20, but which fluid is not at the maximum temperature to which the unit is capable of heating the same. In other words, additional heat is absorbed in the generating section 38 by the fluid as it travels in a generally upward direction through the generating section 38. The principal advantage of such an arrangement is that excessive temperatures in the lowermost pancake coil 60 are avoided. The arrangement also creates a higher temperature differential between the temperature of the fluid in the coil and the temperature of the combustion gases, which increases the effectiveness of the heating coil. In fact, thermal efficiencies as high as 82% are commonly attained in units embodying the coil assembly 35.

The present coil construction not only makes it possible to develop a given boiler horsepower with less heating surface than previous unit designed to develop the same boiler horsepower, but has also resulted in a reduction in the feed pump pressure required to force the feed water into the coil. For example, previous 50 horsepower units supplying steam at a pressure of 100 lbs. per square inch have required a feed pump pressure of 280 to 290 lbs. per square inch as compared with a feed water pump pressure of 260 lbs. per square inch for the present unit. This indicates that less actual steam or vapor was formed in the heating coil 35 with a greater proportion of solid liquid than vapor, which resulted in less friction flow loss through said coil. In practice, it is desired to maintain a stream of fluid flowing through the heating coil 35 containing a maximum ratio of 25% vapor to 75% liquid. In other words, the reduction in the back pressure indicates that a greater percentage of heat is absorbed by the liquid and only a comparatively small amount of the liquid is converted to vapor during the passage of liquid through the heating coil before it discharges from the outlet pipe 71 into a steam separator or other apparatus (not shown).

While the heating coil, combustion chamber lining means, and the means for maintaining a low jacket temperature have been described in connection with a steam generating apparatus, it is to be understood that the invention is not limited to the use of these features in apparatus for generating steam, and that the invention contemplates their use wherever susceptible.

The details of the invention disclosed herein, other than the heating coil per se and the method of making the same, are claimed in my copending application Serial No. 688,721, filed August 6, 1946, now Patent 2,576,988, granted December 4, 1951.

It will be understood that various changes may be made in the materials and details of construction of the apparatus disclosed herein, and in the method of making the heating coil, without departing from the spirit of the invention or the scope of the annexed claims.

I claim:

1. The method of making a double wound heating coil, including the steps of: arranging two lengths of pipe substantially parallel with their ends coinciding; securing two adjacent ends of said pipe to a mandrel; simultaneously winding a portion of said two lengths of pipe upon said mandrel with the turns closely adjacent each other; inserting separate and circumferentially spaced spacer elements between the last wound turn and the adjacent unwound portion of one of said pipes and inserting spacer elements between the unwound portions of both of said pipes adjacent said mandrel to effect a predetermined spacing of the turns wound thereafter from the previously wound turns and from each other; completing the winding of said pipes upon said mandrel with the spacers disposed as specified, and thereafter removing said coil and spacers from said mandrel as a unit.

2. The method of making a heating coil structure, including the steps of: winding pipe upon a mandrel to form a coil with the turns thereof substantially in contact; placing a shell of predetermined internal diameter slightly larger than the wound diameter of the coil over the wound coil; releasing the winding torque on the mandrel to allow the coil to partially unwind into engagement with the inner surface of said shell, and thereafter removing said shell and coil as a unit from said mandrel.

References Cited in the file of this patent

UNITED STATES PATENTS

| Number | Name | Date |
|---|---|---|
| 1,993,171 | Hyde | Mar. 5, 1935 |
| 2,012,216 | Baumann | Aug. 20, 1935 |
| 2,146,823 | Karmazin | Feb. 14, 1939 |
| 2,210,353 | Barnes | Aug. 6, 1940 |
| 2,231,295 | Price | Feb. 11, 1941 |
| 2,237,890 | Sabins | Apr. 8, 1941 |
| 2,250,879 | Rieger | July 29, 1941 |
| 2,359,791 | Ralston | Oct. 10, 1944 |
| 2,366,141 | Alderfer | Dec. 26, 1944 |
| 2,507,293 | Arant | May 9, 1950 |

FOREIGN PATENTS

| Number | Country | Date |
|---|---|---|
| 548,686 | Great Britain | Oct. 20, 1942 |